(12) United States Patent
Harel et al.

(10) Patent No.: US 10,552,380 B2
(45) Date of Patent: Feb. 4, 2020

(54) SYSTEM AND METHOD FOR CONTEXTUALLY ENRICHING A CONCEPT DATABASE

(71) Applicant: Cortica, Ltd., Tel Aviv (IL)

(72) Inventors: Adam Harel, Tel Aviv (IL); Igal Raichelgauz, Tel Aviv (IL); Karina Odinaev, Tel Aviv (IL); Yehoshua Y Zeevi, Haifa (IL)

(73) Assignee: Cortica Ltd, Tel Aviv (IL)

( * ) Notice: Subject to any disclaimer, the term of this patent is extended or adjusted under 35 U.S.C. 154(b) by 233 days.

(21) Appl. No.: 15/722,608

(22) Filed: Oct. 2, 2017

(65) Prior Publication Data

US 2018/0025020 A1  Jan. 25, 2018

Related U.S. Application Data

(63) Continuation-in-part of application No. 15/296,551, filed on Oct. 18, 2016, which is a continuation-in-part
(Continued)

(30) Foreign Application Priority Data

Oct. 26, 2005  (IL) .......................... 171577
Jan. 29, 2006  (IL) .......................... 173409
Aug. 21, 2007  (IL) .......................... 185414

(51) Int. Cl.
*G06F 17/30* (2006.01)
*G06F 16/174* (2019.01)
(Continued)

(52) U.S. Cl.
CPC ...... *G06F 16/1748* (2019.01); *G06F 16/2228* (2019.01); *G06F 16/285* (2019.01);
(Continued)

(58) Field of Classification Search
CPC .... G06F 16/1748; G06F 16/43; G06F 16/285; G06F 16/2228; G06F 16/41; Y10S 707/99943; Y10S 707/99948
See application file for complete search history.

(56) References Cited

U.S. PATENT DOCUMENTS 4,733,353 A  3/1988  Jaswa
4,932,645 A  6/1990  Schorey et al.
(Continued)

FOREIGN PATENT DOCUMENTS

WO         0231764      4/2002
WO      2003005242 A1  1/2003
(Continued)

OTHER PUBLICATIONS

Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
(Continued)

*Primary Examiner* — Jared M Bibbee

(57) ABSTRACT

A system and method for contextually enriching a concept database. The method includes determining, based on at least one signature of a first multimedia data element (MMDE) and signatures of a plurality of third concepts stored in the concept database, at least one matching first concept among the plurality of third concepts; generating a reduced representation of the first MMDE; comparing the reduced representation of the first MMDE to signatures representing a plurality of second MMDEs to determine a plurality of matching MMDEs among the plurality of second MMDEs; generating, based on the reduced representation of the first MMDE and the signatures representing the plurality of matching MMDEs, a second concept; and generating at least one context based on the second concept and the
(Continued)

plurality of third concepts, wherein each context includes at least one common pattern among the second concept and at least one of the plurality of third concepts.

20 Claims, 6 Drawing Sheets

Related U.S. Application Data of application No. 14/643,694, filed on Mar. 10, 2015, now Pat. No. 9,672,217, which is a continuation of application No. 13/766,463, filed on Feb. 13, 2013, now Pat. No. 9,031,999, which is a continuation-in-part of application No. 13/602,858, filed on Sep. 4, 2012, now Pat. No. 8,868,619, which is a continuation of application No. 12/603,123, filed on Oct. 21, 2009, now Pat. No. 8,266,185, which is a continuation-in-part of application No. 12/084,150, filed as application No. PCT/IL2006/001235 on Oct. 26, 2006, now Pat. No. 8,655,801, said application No. 12/603,123 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 12/603,123 is a continuation-in-part of application No. 12/348,888, filed on Jan. 5, 2009, now Pat. No. 9,798,795, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, and a continuation-in-part of application No. 12/348,888, filed on Jan. 5, 2009, now Pat. No. 9,798,795.

(60) Provisional application No. 62/403,145, filed on Oct. 2, 2016, provisional application No. 62/310,742, filed on Mar. 20, 2016.

(51) Int. Cl.
 *G06F 16/41* (2019.01)
 *G06F 16/43* (2019.01)
 *G06F 16/28* (2019.01)
 *G06F 16/22* (2019.01)

(52) U.S. Cl.
 CPC ............ *G06F 16/41* (2019.01); *G06F 16/43* (2019.01); *Y10S 707/99943* (2013.01); *Y10S 707/99948* (2013.01)

(56) References Cited

U.S. PATENT DOCUMENTS

| | | |
|---|---|---|
| 4,972,363 A | 11/1990 | Nguyen et al. |
| 5,307,451 A | 4/1994 | Clark |
| 5,568,181 A | 10/1996 | Greenwood et al. |
| 5,745,678 A | 4/1998 | Herzberg et al. |
| 5,806,061 A | 9/1998 | Chaudhuri et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,940,821 A | 8/1999 | Wical |
| 5,978,754 A | 11/1999 | Kumano |
| 5,987,454 A | 11/1999 | Hobbs |
| 6,038,560 A | 3/2000 | Wical |
| 6,052,481 A | 4/2000 | Grajski et al. |
| 6,076,088 A | 6/2000 | Paik et al. |
| 6,122,628 A | 9/2000 | Castelli et al. |
| 6,137,911 A | 10/2000 | Zhilyaev |
| 6,144,767 A | 11/2000 | Bottou et al. |
| 6,147,636 A | 11/2000 | Gershenson |
| 6,240,423 B1 | 5/2001 | Hirata |
| 6,243,375 B1 | 6/2001 | Speicher |
| 6,243,713 B1 | 6/2001 | Nelson et al. |
| 6,275,599 B1 | 8/2001 | Adler et al. |
| 6,329,986 B1 | 12/2001 | Cheng |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,507,672 B1 | 1/2003 | Watkins et al. |
| 6,523,022 B1 | 2/2003 | Hobbs |
| 6,523,046 B2 | 2/2003 | Liu et al. |
| 6,524,861 B1 | 2/2003 | Anderson |
| 6,526,400 B1 | 2/2003 | Takata et al. |
| 6,550,018 B1 | 4/2003 | Abonamah et al. |
| 6,560,597 B1 | 5/2003 | Dhillon et al. |
| 6,594,699 B1 | 7/2003 | Sahai et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,675,159 B1 | 1/2004 | Lin et al. |
| 6,704,725 B1 | 3/2004 | Lee |
| 6,728,706 B2 | 4/2004 | Aggarwal et al. |
| 6,732,149 B1 | 5/2004 | Kephart |
| 6,751,363 B1 | 6/2004 | Natsev et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,819,797 B1 | 11/2004 | Smith et al. |
| 6,836,776 B2 | 12/2004 | Schreiber |
| 6,845,374 B1 | 1/2005 | Oliver et al. |
| 6,901,207 B1 | 5/2005 | Watkins |
| 6,938,025 B1 | 8/2005 | Lulich et al. |
| 6,970,881 B1 | 11/2005 | Mohan et al. |
| 6,978,264 B2 | 12/2005 | Chandrasekar et al. |
| 7,006,689 B2 | 2/2006 | Kasutani |
| 7,013,051 B2 | 3/2006 | Sekiguchi et al. |
| 7,043,473 B1 | 5/2006 | Rassool et al. |
| 7,124,149 B2 | 10/2006 | Smith et al. |
| 7,158,681 B2 | 1/2007 | Persiantsev |
| 7,199,798 B1 | 4/2007 | Echigo et al. |
| 7,215,828 B2 | 5/2007 | Luo |
| 7,260,564 B1 | 8/2007 | Lynn et al. |
| 7,277,928 B2 | 10/2007 | Lennon |
| 7,296,012 B2 | 11/2007 | Ohashi |
| 7,302,117 B2 | 11/2007 | Sekiguchi et al. |
| 7,313,805 B1 | 12/2007 | Rosin et al. |
| 7,346,629 B2 | 3/2008 | Kapur et al. |
| 7,392,238 B1 | 6/2008 | Zhou et al. |
| 7,406,459 B2 | 7/2008 | Chen et al. |
| 7,450,740 B2 | 11/2008 | Shah et al. |
| 7,523,102 B2 | 4/2009 | Bjarnestam et al. |
| 7,526,607 B1 | 4/2009 | Singh et al. |
| 7,536,384 B2 | 5/2009 | Venkataraman et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |

(56) References Cited

U.S. PATENT DOCUMENTS

| | | |
|---|---|---|
| 7,574,668 B2 | 8/2009 | Nunez et al. |
| 7,577,656 B2 | 8/2009 | Kawai et al. |
| 7,657,100 B2 | 2/2010 | Gokturk et al. |
| 7,660,468 B2 | 2/2010 | Gokturk et al. |
| 7,694,318 B2 | 4/2010 | Eldering et al. |
| 7,836,054 B2 | 11/2010 | Kawai et al. |
| 7,920,894 B2 | 4/2011 | Wyler |
| 7,921,107 B2 | 4/2011 | Chang et al. |
| 7,933,407 B2 | 4/2011 | Keidar et al. |
| 7,974,994 B2 | 7/2011 | Li et al. |
| 7,987,194 B1 | 7/2011 | Walker et al. |
| 7,987,217 B2 | 7/2011 | Long et al. |
| 7,991,715 B2 | 8/2011 | Schiff et al. |
| 8,000,655 B2 | 8/2011 | Wang et al. |
| 8,036,893 B2 | 10/2011 | Reich |
| 8,098,934 B2 | 1/2012 | Vincent et al. |
| 8,112,376 B2 | 2/2012 | Raichelgauz et al. |
| 8,266,185 B2 | 9/2012 | Raichelgauz et al. |
| 8,312,031 B2 | 11/2012 | Raichelgauz et al. |
| 8,315,442 B2 | 11/2012 | Gokturk et al. |
| 8,316,005 B2 | 11/2012 | Moore |
| 8,326,775 B2 | 12/2012 | Raichelgauz et al. |
| 8,345,982 B2 | 1/2013 | Gokturk et al. |
| 8,548,828 B1 | 10/2013 | Longmire |
| 8,655,801 B2 | 2/2014 | Raichelgauz et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,323,754 B2 | 4/2016 | Ramanathan et al. |
| 9,330,189 B2 | 5/2016 | Raichelgauz et al. |
| 9,438,270 B2 | 9/2016 | Raichelgauz et al. |
| 2001/0019633 A1 | 9/2001 | Tenze et al. |
| 2001/0038876 A1 | 11/2001 | Anderson |
| 2001/0056427 A1 | 12/2001 | Yoon et al. |
| 2002/0010682 A1 | 1/2002 | Johnson |
| 2002/0019881 A1 | 2/2002 | Bokhari et al. |
| 2002/0038299 A1 | 3/2002 | Zernik et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0041047 A1* | 2/2003 | Chang .................... G06F 16/40 |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0105739 A1 | 6/2003 | Essafi et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0191776 A1* | 10/2003 | Obrador .................. G06F 16/94 |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0010553 A1* | 1/2005 | Liu ........................ G06F 16/58 |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0172130 A1 | 8/2005 | Roberts |
| 2005/0177372 A1 | 8/2005 | Wang et al. |
| 2005/0238238 A1 | 10/2005 | Xu et al. |
| 2005/0245241 A1 | 11/2005 | Durand et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0253423 A1 | 11/2006 | McLane et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0033163 A1 | 2/2007 | Epstein et al. |
| 2007/0038608 A1 | 2/2007 | Chen |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |

(56) References Cited

U.S. PATENT DOCUMENTS

| | | |
|---|---|---|
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130112 A1 | 6/2007 | Lin |
| 2007/0130159 A1 | 6/2007 | Gulli et al. |
| 2007/0168413 A1 | 7/2007 | Barletta et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0152231 A1 | 6/2008 | Gokturk et al. |
| 2008/0163288 A1 | 7/2008 | Ghosal et al. |
| 2008/0165861 A1 | 7/2008 | Wen et al. |
| 2008/0172615 A1 | 7/2008 | Igelman et al. |
| 2008/0201299 A1 | 8/2008 | Lehikoinen et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0313140 A1 | 12/2008 | Pereira et al. |
| 2009/0013414 A1 | 1/2009 | Washington et al. |
| 2009/0022472 A1 | 1/2009 | Bronstein et al. |
| 2009/0037408 A1 | 2/2009 | Rodgers |
| 2009/0043637 A1 | 2/2009 | Eder |
| 2009/0089587 A1 | 4/2009 | Brunk et al. |
| 2009/0119157 A1 | 5/2009 | Dulepet |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0277322 A1 | 11/2009 | Cai et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0202848 A1 | 8/2011 | Ismalon |
| 2011/0246566 A1 | 10/2011 | Kashef et al. |
| 2011/0251896 A1 | 10/2011 | Impollonia et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0185445 A1 | 7/2012 | Borden et al. |
| 2012/0197857 A1 | 8/2012 | Huang et al. |
| 2012/0239694 A1 | 9/2012 | Avner et al. |
| 2012/0299961 A1 | 11/2012 | Ramkumar et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0147829 A1 | 5/2014 | Jerauld |
| 2014/0152698 A1 | 6/2014 | Kim et al. |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2015/0286742 A1 | 10/2015 | Zhang et al. |
| 2015/0289022 A1 | 10/2015 | Gross |
| 2016/0026707 A1 | 1/2016 | Ong et al. |

FOREIGN PATENT DOCUMENTS

| | | |
|---|---|---|
| WO | 2003067467 A1 | 8/2003 |
| WO | 2004019527 A1 | 3/2004 |
| WO | 2005027457 A1 | 3/2005 |
| WO | WO2007049282 | 5/2007 |
| WO | 2014137337 A1 | 9/2014 |
| WO | 2016040376 A1 | 3/2016 |

OTHER PUBLICATIONS

Boari et al, "Adaptive Routing for Dynamic Applications in Massively Parallel Architectures", 1995 IEEE, Spring 1995.

Brecheisen, et al., "Hierarchical Genre Classification for Large Music Collections", ICME 2006, pp. 1385-1388.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al., "Feed-forward Echo State Networks"; Proceedings of International Joint Conference on Neural Networks, Montreal, Canada, Jul. 31-Aug. 4, 2005; Entire Document.

Chuan-Yu Cho, et al., "Efficient Motion-Vector-Based Video Search Using Query by Clip", 2004, IEEE, Taiwan, pp. 1-4.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Fathy et al., "A Parallel Design and Implementation For Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Foote, Jonathan, et al. "Content-Based Retrieval of Music and Audio", 1997 Institute of Systems Science, National University of Singapore, Singapore (Abstract).

Freisleben et al., "Recognition of Fractal Images Using a Neural Network", Lecture Notes in Computer Science, 1993, vol. 6861, 1993, pp. 631-637.

(56) References Cited

OTHER PUBLICATIONS

Garcia, "Solving the Weighted Region Least Cost Path Problem Using Transputers", Naval Postgraduate School, Monterey, California, Dec. 1989.
Gomes et al., "Audio Watermaking and Fingerprinting: For Which Applications?" University of Rene Descartes, Paris, France, 2003.
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.
Guo et al, "AdOn: An Intelligent Overlay Video Advertising System", SIGIR, Boston, Massachusetts, Jul. 19-23, 2009.
Howlett et al., "A Multi-Computer Neural Network Architecture in a Virtual Sensor System Application", International Journal of Knowledge-based Intelligent Engineering Systems, 4 (2). pp. 86-93, 133N 1327-2314.
Ihab Al Kabary, et al., "SportSense: Using Motion Queries to Find Scenes in Sports Videos", Oct. 2013, ACM, Switzerland, pp. 1-3.
International Search Authority: "Written Opinion of the International Searching Authority" (PCT Rule 43bis.1) including International Search Report for International Patent Application No. PCT/US2008/073852; dated Jan. 28, 2009.
International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; dated Jul. 28, 2009.
International Search Report for the corresponding International Patent Application PCT/IL2006/001235; dated Nov. 2, 2008.
IPO Examination Report under Section 18(3) for corresponding UK application No. GB1001219.3, dated Sep. 12, 2011.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Jaeger, H.: "The "echo state" approach to analysing and training recurrent neural networks", GMD Report, No. 148, 2001, pp. 1-43, XP002466251 German National Research Center for Information Technology.
Jianping Fan et al., "Concept-Oriented Indexing of Video Databases: Towards Semantic Sensitive Retrieval and Browsing", IEEE, vol. 13, No. 7, Jul. 2004, pp. 1-19.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009A960375, IEEE Conference Publications, Arizona.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.20142359332 IEEE Journals & Magazines.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass, W. et al.: "Computational Models for Generic Cortical Microcircuits", Institute for Theoretical Computer Science, Technische Universitaet Graz, Graz, Austria, published Jun. 10, 2003.
Mahdhaoui, et al, "Emotional Speech Characterization Based on Multi-Features Fusion for Face-to-Face Interaction", Universite Pierre et Marie Curie, Paris, France, 2009.
Marti et al, "Real Time Speaker Localization and Detection System for Camera Steering in Multiparticipant Videoconferencing Environments", Universidad Politecnica de Valencia, Spain, 2011.
May et al., "The Transputer", Springer-Verlag, Berlin Heidelberg, 1989, teaches multiprocessing system.
Micnamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.
Nam, et al., "Audio Visual Content-Based Violent Scene Characterization", Department of Electrical and Computer Engineering, Minneapolis, MN, 1998, pp. 353-357.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Odinaev, et al., "Cliques in Neural Ensembles as Perception Carriers", Technion—Israel Institute of Technology, 2006 International Joint Conference on Neural Networks, Canada, 2006, pp. 285-292.
Ortiz-Boyer et al., "CIXL2: A Crossover Operator for Evolutionary Algorithms Based on Population Features", Journal of Artificial Intelligence Research 24 (2005), pp. 1-48 Submitted Nov. 2004; published Jul. 2005.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Queluz, "Content-Based Integrity Protection of Digital Images", SPIE Conf. on Security and Watermarking of Multimedia Contents, San Jose, Jan. 1999, pp. 85-93, downloaded from http://proceedings.spiedigitallibrary.org on Aug. 2, 2017.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Santos, et al., "SCORM-MPEG: an Ontology of Interoperable Metadata for Multimedia and e-Learning", 2015 23rd International Conference on Software, Telecommunications and Computer Networks (SoftCOM) Year 2015, pp. 224-228, DOI: 10.1109/SOFTCOM.2015.7314122 IEEE Conference Publications.

(56) References Cited

OTHER PUBLICATIONS

Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Schneider, et. al., "A Robust Content Based Digital Signature for Image Authentication", Proc. ICIP 1996, Laussane, Switzerland, Oct. 1996, pp. 227-230.
Semizarov et al. "Specificity of Short Interfering RNA Determined through Gene Expression Signatures", PNAS, 2003, pp. 6347-6352.
Shin-Fu Chang, et al., "VideoQ: A Fully Automated Video Retrieval System Using Motion Sketches", 1998, IEEE, , New York, pp. 1-2.
The International Search Report and the Written Opinion for PCT/US2016/050471, ISA/RU, Moscow, RU, dated May 4, 2017.
The International Search Report and the Written Opinion for PCT/US2016/054634 dated Mar. 16, 2017, ISA/RU, Moscow, RU.
The International Search Report and the Written Opinion for PCT/US2017/015831, ISA/RU, Moscow, Russia, dated Apr. 20, 2017.
Theodoropoulos et al, "Simulating Asynchronous Architectures on Transputer Networks", Proceedings of the Fourth Euromicro Workshop on Parallel and Distributed Processing, 1996. PDP '96.
Vailaya, et al., "Content-Based Hierarchical Classification of Vacation Images," I.E.E.E: Multimedia Computing and Systems, vol. 1, 1999, East Lansing, MI, pp. 518-523.
Vallet, et al. "Personalized Content Retrieval in Context Using Ontological Knowledge," IEEE Transactions on Circuits and Systems for Video Technology, vol. 17, No. 3, Mar. 2007, pp. 336-346.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005; Entire Document.
Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.
Wang et al. "A Signature for Content-based Image Retrieval Using a Geometrical Transform", ACM 1998, pp. 229-234.
Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.
Wei-Te Li et al., "Exploring Visual and Motion Saliency for Automatic Video Object Extraction", IEEE, vol. 22, No. 7, Jul. 2013, pp. 1-11.
Whitby-Strevens, "The Transputer", 1985 IEEE, Bristol, UK.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Yanai, "Generic Image Classification Using Visual Knowledge on the Web," MM'03, Nov. 2-8, 2003, Tokyo, Japan, pp. 167-176.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002; Entire Document.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.
Zou, et al., "A Content-Based Image Authentication System with Lossless Data Hiding", ICME 2003, pp. 213-216.

\* cited by examiner

SYSTEM AND METHOD FOR CONTEXTUALLY ENRICHING A CONCEPT DATABASE

CROSS-REFERENCE TO RELATED APPLICATIONS

This application claims the benefit of U.S. Provisional Application No. 62/403,145 filed on Oct. 2, 2016. This application is also a continuation-in-part of U.S. patent application Ser. No. 15/296,551 filed on Oct. 18, 2016, now pending, which claims the benefit of U.S. Provisional Patent Application No. 62/310,742 filed on Mar. 20, 2016. The Ser. No. 15/296,551 application is also a continuation-in-part of U.S. patent application Ser. No. 14/643,694 filed on Mar. 10, 2015, now U.S. Pat. No. 9,672,217, which is a continuation of U.S. patent application Ser. No. 13/766,463 filed on Feb. 13, 2013, now U.S. Pat. No. 9,031,999. The Ser. No. 13/766,463 application is a continuation-in-part of U.S. patent application Ser. No. 13/602,858 filed on Sep. 4, 2012, now U.S. Pat. No. 8,868,619. The Ser. No. 13/602,858 application is a continuation of U.S. patent application Ser. No. 12/603,123 filed on Oct. 21, 2009, now U.S. Pat. No. 8,266,185. The Ser. No. 12/603,123 application is a continuation-in-part of:

(1) U.S. patent application Ser. No. 12/084,150 having a filing date of Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005, and Israeli Application No. 173409 filed on Jan. 29, 2006;

(2) U.S. patent application Ser. No. 12/195,863 filed on Aug. 21, 2008, now U.S. Pat. No. 8,326,775, which claims priority under 35 USC 119 from Israeli Application No. 185414, filed on Aug. 21, 2007, and which is also a continuation-in-part of the above-referenced U.S. patent application Ser. No. 12/084,150;

(3) U.S. patent application Ser. No. 12/348,888 filed on Jan. 5, 2009, now pending, which is a continuation-in-part of the above-referenced U.S. patent application Ser. Nos. 12/084,150 and 12/195,863; and (4) U.S. patent application Ser. No. 12/538,495 filed on Aug. 10, 2009, now U.S. Pat. No. 8,312,031, which is a continuation-in-part of the above-referenced U.S. patent application Ser. Nos. 12/084,150; 12/195,863; and Ser. No. 12/348,888.

All of the applications referenced above are herein incorporated by reference.

TECHNICAL FIELD

The present disclosure relates generally to content management, and more particularly to the enrichment of a concept database for the purpose of effective storage, management, knowledge database generation and search.

BACKGROUND

As the amount of content available over the Internet continues to grow exponentially in size, the task of finding relevant content has become increasingly cumbersome. Further, such content may not always be sufficiently organized or identified, thereby resulting in missed content.

With the abundance of multimedia data made available through various means in general and the Internet and world-wide web (WWW) in particular, there is a need for effective ways of searching for, and management of, such multimedia data. Searching, organizing and management of multimedia data can be challenging at best due to the difficulty involved in representing and comparing the information embedded within the content, and due to the scale of information to be checked.

Moreover, when it is necessary to find content by means of a textual query, some existing solutions revert to various metadata that textually describe the content of the multimedia data. However, such content may be abstract and complex by nature and not adequately defined by the existing and/or attached metadata.

The rapidly increasing multimedia databases, accessible for example through the Internet, calls for the application of new methods of representation of information embedded in the content. Searching for multimedia is challenging due to the large amount of information that has to be priority indexed, classified and clustered. Moreover, existing solutions revert to model-based methods to define and/or describe multimedia data.

However, by its very nature, the structure of such multimedia data may be too abstract and/or complex to be adequately represented by means of metadata. The difficulty arises in cases where the target sought for multimedia data is not adequately defined in words, or by respective metadata of the multimedia data. For example, it may be desirable to locate a car of a particular model in a large database of images or video clips or segments. In some cases, the model of the car would be part of the metadata, but in many cases, it would not. Moreover, the image of the car may be at angles different from the angles of a specific photograph of the car that is available as a reference search item. Similarly, if a piece of music, as in a sequence of notes, is to be found, it is not necessarily the case that in all available content the notes are known in their metadata form, or for that matter, the search pattern may just be a brief audio clip.

Searching multimedia content has been a challenge for a number of years and has therefore received considerable attention. Early systems would take a multimedia data element in the form of, for example, an image, compute various visual features from it and then search one or more indexes to return images with similar features. In addition, values for these features and appropriate weights reflecting their relative importance could be also used. These methods have improved over time to handle various types of multimedia inputs and to handle them in an ever-increasing effectiveness. However, because of the exponential growth of the use of the Internet, the multimedia data available from these existing solutions have become less effective in handling the currently available multimedia data due to the vast amounts already existing as well as the speed at which new data is added.

Searching through multimedia data has therefore become a significant challenge, where even the addition of metadata to assist in the search has limited functionality. First, metadata may be inaccurate or not fully descriptive of the multimedia data, and second, not every piece of multimedia data can be described accurately enough by a sequence of textual metadata. A query model for a search engine has some advantages, such as comparison and ranking of images based on objective visual features, rather than on subjective image annotations. However, the query model has its drawbacks as well. When no metadata is available and only the multimedia data needs to be used, the process requires significant effort. Those skilled in the art will appreciate that there is no known intuitive way of describing multimedia data.

Therefore, a large gap may be found between a user's perception or conceptual understanding of the multimedia data and the way it is actually stored and manipulated by a search engine. The current generation of web applications is effective at aggregating massive amounts of data of different multimedia content, such as pictures, videos, clips, paintings and mash-ups, capable of slicing and dicing it in different ways, as well as searching it and displaying it in an organized fashion, by using, for example, concept networks.

A concept may enable understanding of a multimedia data from its related concept. However, existing solutions are unable to add any real "intelligence" to the mix, i.e. no new knowledge is extracted from the multimedia data aggregated by these systems. Moreover, the systems tend to be non-scalable due to the vast amounts of data they must handle, as many are configured to analyze and reanalyze entire multimedia data elements to identify various part contained therein. This hinders the ability to provide high quality searching for multimedia content.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for contextually enriching a concept database. The method comprises: determining, based on at least one signature of a first multimedia data element (MMDE) and signatures of a plurality of third concepts stored in the concept database, at least one first concept among the plurality of third concepts, wherein each of the at least one first concept matches at least a portion of the at least one signature of the first MMDE; generating a reduced representation of the first MMDE, wherein the reduced representation does not represent the at least a portion of the first MMDE matching the at least one first concept; comparing the reduced representation of the first MMDE to signatures representing a plurality of second MMDEs to determine a plurality of matching MMDEs among the plurality of second MMDEs; generating, based on the reduced representation of the first MMDE and the signatures representing the plurality of matching MMDEs, a second concept; and generating at least one context based on the second concept and the plurality of third concepts, wherein each context includes at least one common pattern among the second concept and at least one of the plurality of third concepts.

Certain embodiments disclosed herein also include a non-transitory computer readable medium having stored thereon instructions for causing a processing circuitry to perform a process, the process comprising: determining, based on at least one signature of a first multimedia data element (MMDE) and signatures of a plurality of third concepts stored in the concept database, at least one first concept among the plurality of third concepts, wherein each of the at least one first concept matches at least a portion of the at least one signature of the first MMDE; generating a reduced representation of the first MMDE, wherein the reduced representation does not represent the at least a portion of the first MMDE matching the at least one first concept; comparing the reduced representation of the first MMDE to signatures representing a plurality of second MMDEs to determine a plurality of matching MMDEs among the plurality of second MMDEs; generating, based on the reduced representation of the first MMDE and the signatures representing the plurality of matching MMDEs, a second concept; and generating at least one context based on the second concept and the plurality of third concepts, wherein each context includes at least one common pattern among the second concept and at least one of the plurality of third concepts.

Certain embodiments disclosed herein also include a system for contextually enriching a concept database. The system comprises: a processing circuitry; and a memory, the memory containing instructions that, when executed by the processing circuitry, configure the system to: determine, based on at least one signature of a first multimedia data element (MMDE) and signatures of a plurality of third concepts stored in the concept database, at least one first concept among the plurality of third concepts, wherein each of the at least one first concept matches at least a portion of the at least one signature of the first MMDE; generate a reduced representation of the first MMDE, wherein the reduced representation does not represent the at least a portion of the first MMDE matching the at least one first concept; compare the reduced representation of the first MMDE to signatures representing a plurality of second MMDEs to determine a plurality of matching MMDEs among the plurality of second MMDEs; generate, based on the reduced representation of the first MMDE and the signatures representing the plurality of matching MMDEs, a second concept; and generate at least one context based on the second concept and the plurality of third concepts, wherein each context includes at least one common pattern among the second concept and at least one of the plurality of third concepts.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
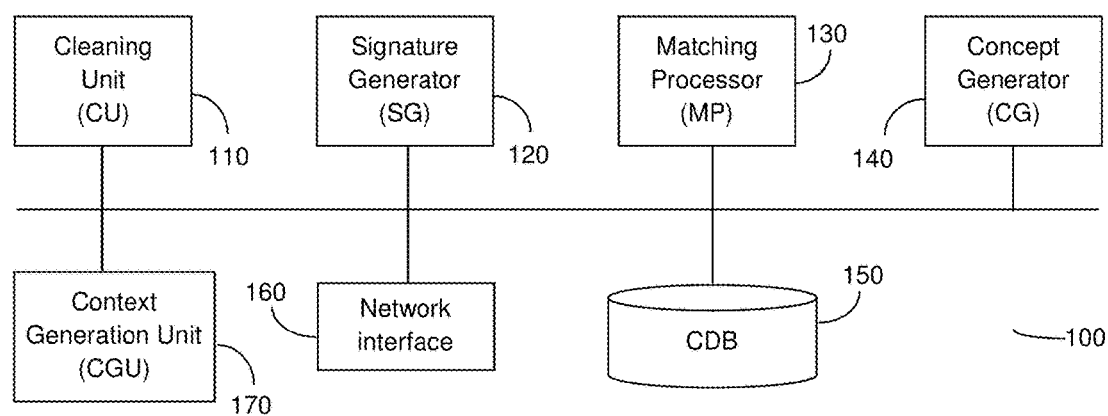
FIG. 1 is a block diagram of a system for enriching a concept database according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for contextually enriching concepts of a content database, including a large-scale web-platform for multimedia deep-content-classification (DCC), capable of continuously enriching a concept database. The concept database includes concepts which provide condensed representations of multimedia content. For example, various images and videos of cats may be represented by signatures generated for portions of multimedia content elements showing features of cats and metadata including the word "cats." Thus, a concept database, as described herein, allows for reduced utilization of memory as compared to, for example, storing full representations of individual multimedia content elements.

The disclosed embodiments allow for generating a context based on the concepts stored in such a concept database. A context is a set of common patterns among concepts. Mathematically, a context can be represented as a matrix of co-occurrences of concepts. A threshold may be associated with the number of co-occurrences of concepts in the matrix utilized to establish a context. Techniques for generating contexts are discussed further herein below. For example, if the MMDE contains images of palm trees, a beach, and the coast line of San Diego, the context of the web page may be determined to be "California sea shore." The context may be used for improved processing and memory utilization when searching for relevant MMDEs.

FIG. 1 shows a block diagram of a system 100 for enriching a concept database according to an embodiment. The system 100 is configured to receive multimedia data elements (MMDEs), for example from the Internet, via a network interface 160. The MMDEs may include, but are not limited to, images, graphics, video streams, video clips, video frames, photographs, images of signals, combinations thereof, and portions thereof. The images of signals may be images such as, but not limited to, medical signals, geophysical signals, subsonic signals, supersonic signals, electromagnetic signals, infrared signals, and portions thereof.

Each received MMDE is analyzed by a signature generator (SG) 120 to generate at least one signature thereto. The operation of the signature generator is described in more detail herein below with respect of FIGS. 3 and 4. In an embodiment, each signature represents a concept structure (hereinafter referred to as a "concept," merely for simplicity purposes), and may be robust to noise, distortion, or both. Based on the at least one signature, the MMDE is matched to a concept database (CDB) 150 by a matching processor (MP) 130. The CDB 150 stores therein a plurality of concepts. Each concept is a collection of signatures representing multimedia data elements and metadata describing the concept, and acts as an abstract description of the content to which the signature was generated. As a non-limiting example, a 'Superman concept' is a signature-reduced cluster of signatures representing elements (such as MMDEs) related to, e.g., a Superman cartoon: and a set of metadata including a textual representation of the Superman concept. As another example, metadata of a concept represented by the signature generated for a picture showing a bouquet of red roses is "flowers." As yet another example, metadata of a concept represented by the signature generated for a picture showing a bouquet of wilted roses is "wilted flowers".

It should be noted that using signatures for generating reduced representations of content shown in MMDEs ensures more accurate identification of concepts featured therein than, for example, based on metadata alone. Specifically, the signatures, as described herein, allow for recognition and classification of multimedia content elements.

Concepts are numeric sequences representative of collections of signatures. The concepts are generated by a process of inter-matching of the signatures once it is determined that there is a number of elements therein above a predefined threshold. The predefined threshold needs to be large enough to enable proper and meaningful clustering. Subsequently to the match of the MMDE to the CDB 150 by the MP 130, a process of cluster reduction takes place so as to extract the most useful data from the cluster while keeping it at an optimal size to produce meaningful results.

The cluster reduction may be performed recursively, for example, after each time a matching concept is found. The cluster reduction allows for increased efficiency and reduced utilization of computing resources while searching for matching concepts. It should be noted that the cluster reduction may limit the scope of potential matches and, therefore, is optional. Further, whether to perform the cluster reduction may be determined based on the degree of matching, the matching concepts, or both. When new signatures are provided after the initial phase, the new signatures may be immediately checked against the reduced clusters, i.e., the concepts structures.

In addition to the cluster reduction, a MMDE cleaning process may be applied to the received MMDE. The cleaning process is performed by a cleaning unit (CU) 110 and involves the removal of redundant elements from the at least one MMDE based on the match. The redundant elements are elements for which concept structures already exist in the CDB 150.

In some implementations, the cleaning process may include a routing process in which the MP 130 queries the CDB 150 for concepts that match the MMDE and a reduced representation of the MMDE is generated. The reduced representation is a cleaned representation of the portions of the MMDE that did not match concepts stored in the CDB 150. To this end, the routing process may include removing portions of the generated signature that match concept structures in the CDB 150, removing portions of the MMDE represented by such matching signature portions, or both. When portions of the MMDE are removed, a reduced representation including signatures representing the remaining portions of the MMDE may be generated. Such a routing process enables reduction of the matching process with the plurality of MMDEs.

As a non-limiting example, if an image of a German Sheppard is received, the first matching concept may be 'dogs'. Upon cleaning of the portion of the image represented by the 'dogs' concept, only characteristics associated with the German Sheppard shall be identified in the further iterations, e.g., long black nose, brown eyes, black-brown wolf-like body figure, etc. However, such characteristics may not be sufficient to provide a match to any of the plurality of MMDEs if separated from the 'dogs' concept. Therefore, the routing may enable a structured match to the plurality of MMDEs, i.e., matching the cleaned MMDE in association with the 'dogs' concept.

As another non-limiting example, upon receiving an image of a Sphinx breed cat, the image is analyzed and signatures are generated respective thereof. The image is then matched to the CDB 150 and a match is made to a 'cats' concept. The characteristics associated with cats (i.e., the characteristics represented by portions of the signature representing the 'cats' concept) are determined to be redundant because they already appear in the CDB 150, and are cleaned from the image such that the remaining portion of the image does not show the cat. Any signatures generated for this cleaned image will no longer match the 'cats' concept.

It should be clear that the routing process may limit the scope of possible matches. Therefore, it is optional, and the decision whether or not to execute such routing process may be made based on the match, concepts structure generated therefore, or both.

The reduced representation of the MMDE is then matched using the signature(s) to a plurality of MMDEs over the web via the network interface 160. According to an embodiment, the match may be to one or more databases coupled to the system 100 either directly or via the network. The MMDEs may be tagged, i.e., their content is known, or untagged.

Based on the match, a plurality of top MMDEs, such as MMDEs from a world database for which the match is above a predetermined threshold, is selected by the MP 130. The MP 130 then matches the top plurality of MMDEs based on their signatures. Based on the match, a concept generator (CG) 140 is configured to create a concept.

The result is a compact representation of a concept that can now be easily compared against a subsequently received MMDE to determine if the subsequently received MMDE matches a concept stored, for example in the CDB 150, by the CG 140. This can be done, for example and without limitation, by providing a query to the system 100 for finding a match between a concept and a MMDE.

Returning to the Sphinx breed cats example, the cleaned image, i.e., without the 'cats' concept, is matched to a world database. Based on the match, a plurality of images and videos in which Sphinx breed cats are shown are identified therein. The identified images and videos are then matched to the received image of a Sphinx and based on the match, a concept of 'Sphinx cats' is generated. The concept is then added to the CDB 150.

In an embodiment, the generated concept is matched to the CDB 150 in order to identify at least a second concept that matches the generated concept above a predetermined threshold in order to determine a context. The match is performed using a context generation unit (CGU) 170. The matching may include correlation of the signatures of the concept structure with signatures of matching concepts stored in the CDB 150. In an embodiment, such analysis includes identification of a ratio of sizes, angles, scale, location, and orientation among the compared signatures as well as with respect to the context. Using probabilistic models, the analysis further determines the probability that a signature of an unidentified element will appear in a similar orientation, location, or both, as a concept's signature.

At least one context is generated based on the analysis. The context may also be sent for storage in the CDB 150 in association with the corresponding concept structures. Accordingly, the CDB 150 may be further enriched with new contexts generated as new concepts are added thereto, thereby allowing for contextually enriching the concepts therein.

Figure 2:
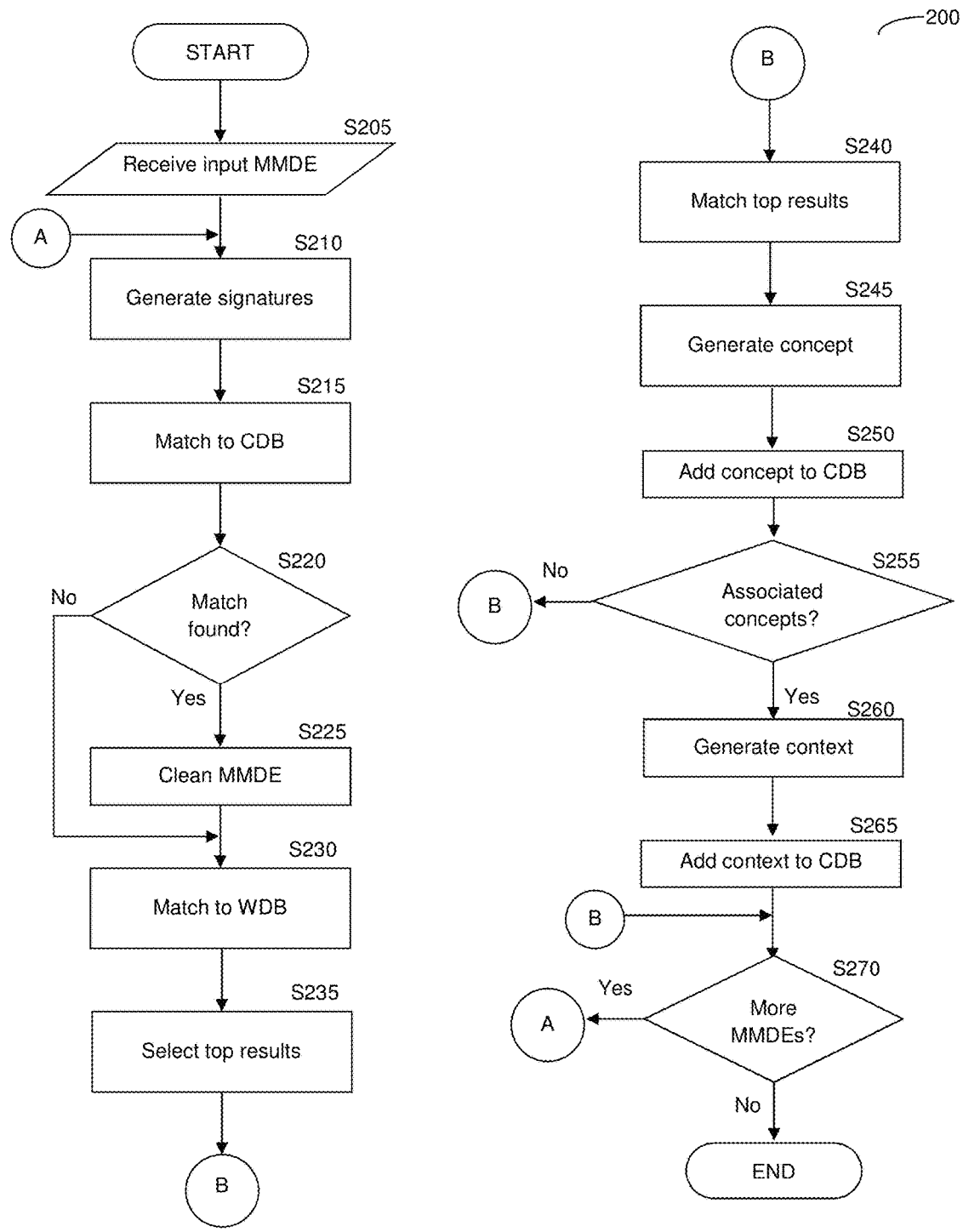
FIG. 2 is a flowchart illustrating a method for contextually enriching a concept database according to an embodiment.

FIG. 2 shows a flowchart illustrating a method 200 for enriching a concept database according to an embodiment. At S205, an input MMDE is received. The at least one MMDE may include, for example, an image, graphics, a video stream, a video clip, a video frame, a photograph, images of signals, combinations thereof, and portions thereof.

At S210, at least one signature is generated based on the input MMDE. The signatures may be generated by, e.g., the SG 120 of FIG. 1. In an embodiment, multiple signatures are generated based on various concepts within the input MMDE. The generation of the signatures is further described herein below with respect of FIGS. 3 and 4.

At S215, the input MMDE is matched to a concept database (CDB). The match is based on the generated at least one signature. The CDB contains previously determined concepts.

At S220, it is checked whether there is at least one concept in the CDB that matches the input MMDE and if so, execution continues with S225; otherwise, execution continues with S230.

At S225, the input MMDE is cleaned with respect to the matching concepts stored in the CDB to create a reduced representation of the at least one MMDE. The reduced representation is created by removing redundant elements from the at least one MMDE, from the generated at least one signature, or both, based on the match. The redundant elements removed at S225 are elements for which concepts already exist in the CDB.

At S230, the reduced representation (or the signatures of the input MMDE, if no matching concepts were found in the CDB) is matched to a world database. The world database may be one or more web sources over the network, one or more locally accessible databases, or a combination thereof. At S235, based on the match, top matched results are selected from the world database(s). The top matched results may be selected based on a predetermined similarity threshold and the like.

At S240, a matching process is performed among the top matched results and the at least one MMDE based on their respective signatures. At S245, based on the matching among the top matched results and the at least one MMDE, a concept is generated.

At S250, the generated concept is added to the CDB.

At S255, it is determined whether any concepts in the CDB are associated with the generated concept and, if so, execution continues with S260; otherwise, execution continues with S270. In an embodiment, S255 includes matching among signatures of the generated concept and of the other concepts stored in the CDB. If signatures of two or more concepts match above a predetermined threshold, the concepts may be determined to be associated.

At S260, when it is determined that the generated concept is associated with one or more existing concepts in the CDB, one or more contexts are generated. In an embodiment, S260 includes matching between signatures of the generated concept and of each associated concept. At optional S265, the newly generated context is added to the CDB. At S270, it is checked whether additional MMDEs have been received and if so, execution continues with S210; otherwise, execution terminates.

Figure 3:
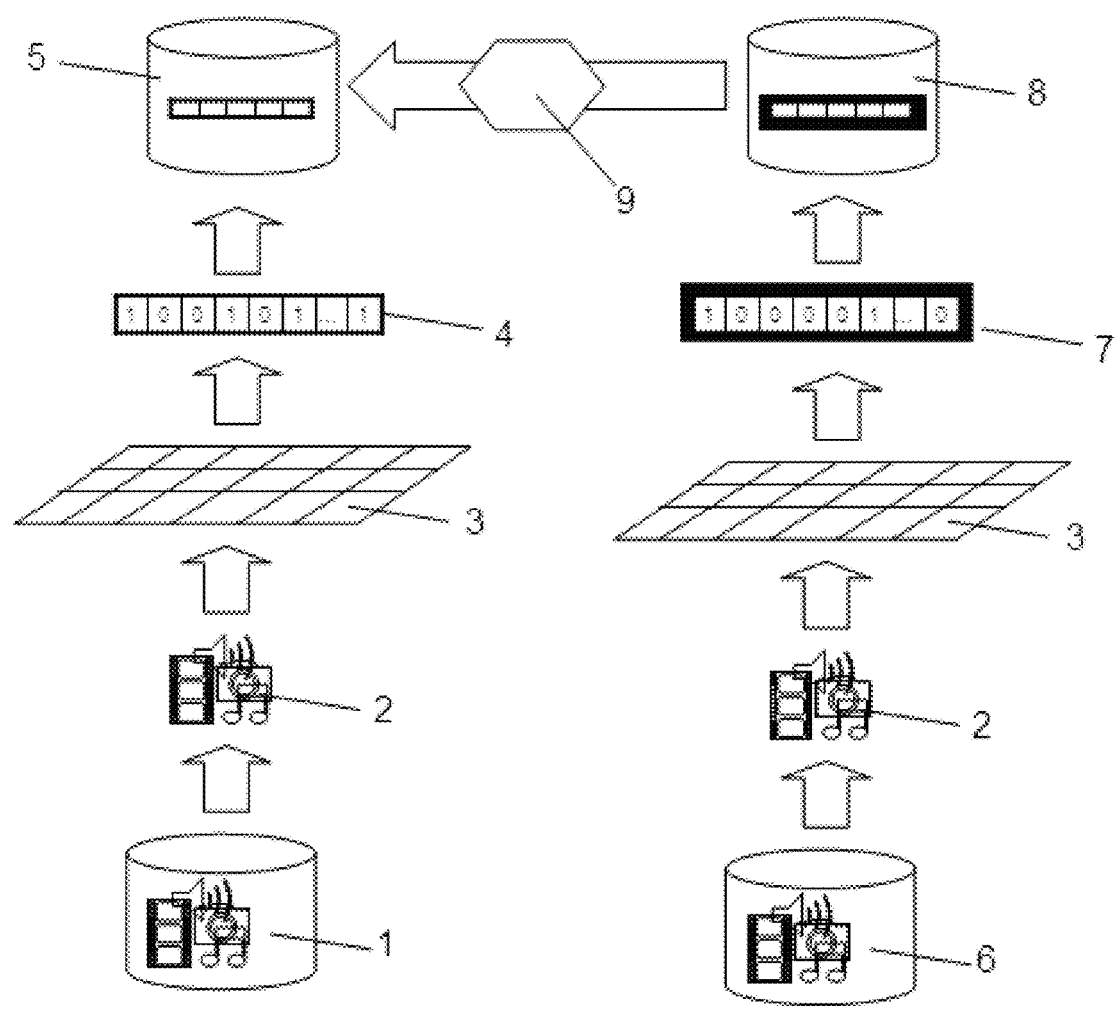
FIG. 3 is a block diagram depicting the basic flow of information in the signature generator system.
Figure 4:
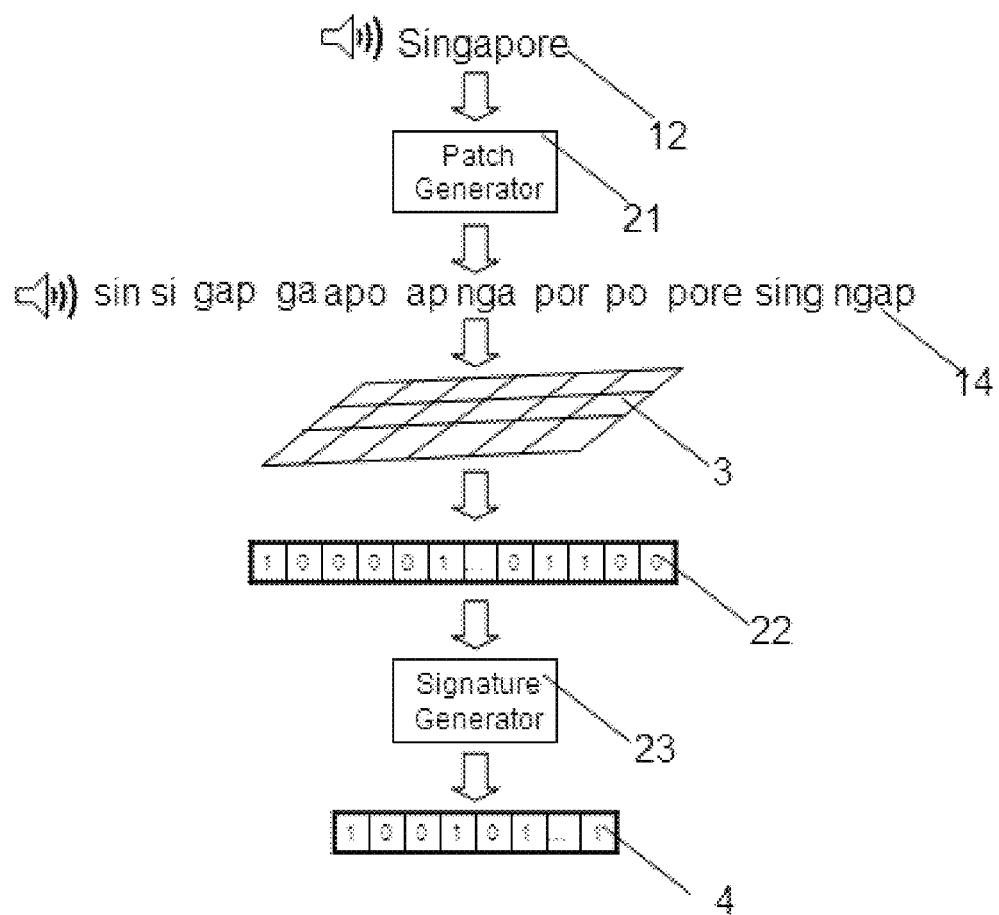
FIG. 4 is a diagram showing the flow of patches generation, response vector generation, and signature generation in a large-scale speech-to-text system.

FIGS. 3 and 4 illustrate the generation of signatures for the multimedia content elements by the SGS 120 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below.

The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames. In an embodiment, the signature generator 120 is configured with a plurality of computational cores to perform matching between signatures.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: which is a Signature vector, and which is a Robust Signature vector.

For generation of signatures robust to additive noise, such as White-Gaussian-Noise, scratch, etc., but not robust to distortions, such as crop, shift and rotation, etc., a core $Ci=\{n_i\}$ ($1 \le i \le L$) may consist of a single leaky integrate-to-threshold unit (LTU) node or more nodes. The node $n_i$ equations are:

$$V_i \sum_j w_{ij} k_j$$

$$n_i = \theta(Vi - Thx)$$

where, $\theta$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); $Th_x$ is a constant Threshold value, where 'x' is 'S' for Signature and 'RS' for Robust Signature; and Vi is a Coupling Node Value.

The Threshold values Thx are set differently for Signature generation and for Robust Signature generation. For example, for a certain distribution of $V_i$ values (for the set of nodes), the thresholds for Signature ($Th_S$) and Robust Signature ($Th_{RS}$) are set apart, after optimization, according to at least one or more of the following criteria:

1: For:

$$V_i > Th_{RS}$$

$$1 - p(V > Th_S) - 1 - (1-\varepsilon)^l \gg 1$$

i.e., given that I nodes (cores) constitute a Robust Signature of a certain image I, the probability that not all of these I nodes will belong to the Signature of same, but noisy image, is sufficiently low (according to a system's specified accuracy).

2:

$$p(V_i > Th_{RS}) \approx l/L$$

i.e., approximately I out of the total L nodes can be found to generate a Robust Signature according to the above definition.

3: Both Robust Signature and Signature are generated for a certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in U.S. Pat. No. 8,655,801, referenced above, the contents of which are hereby incorporated by reference.

Figure 5:
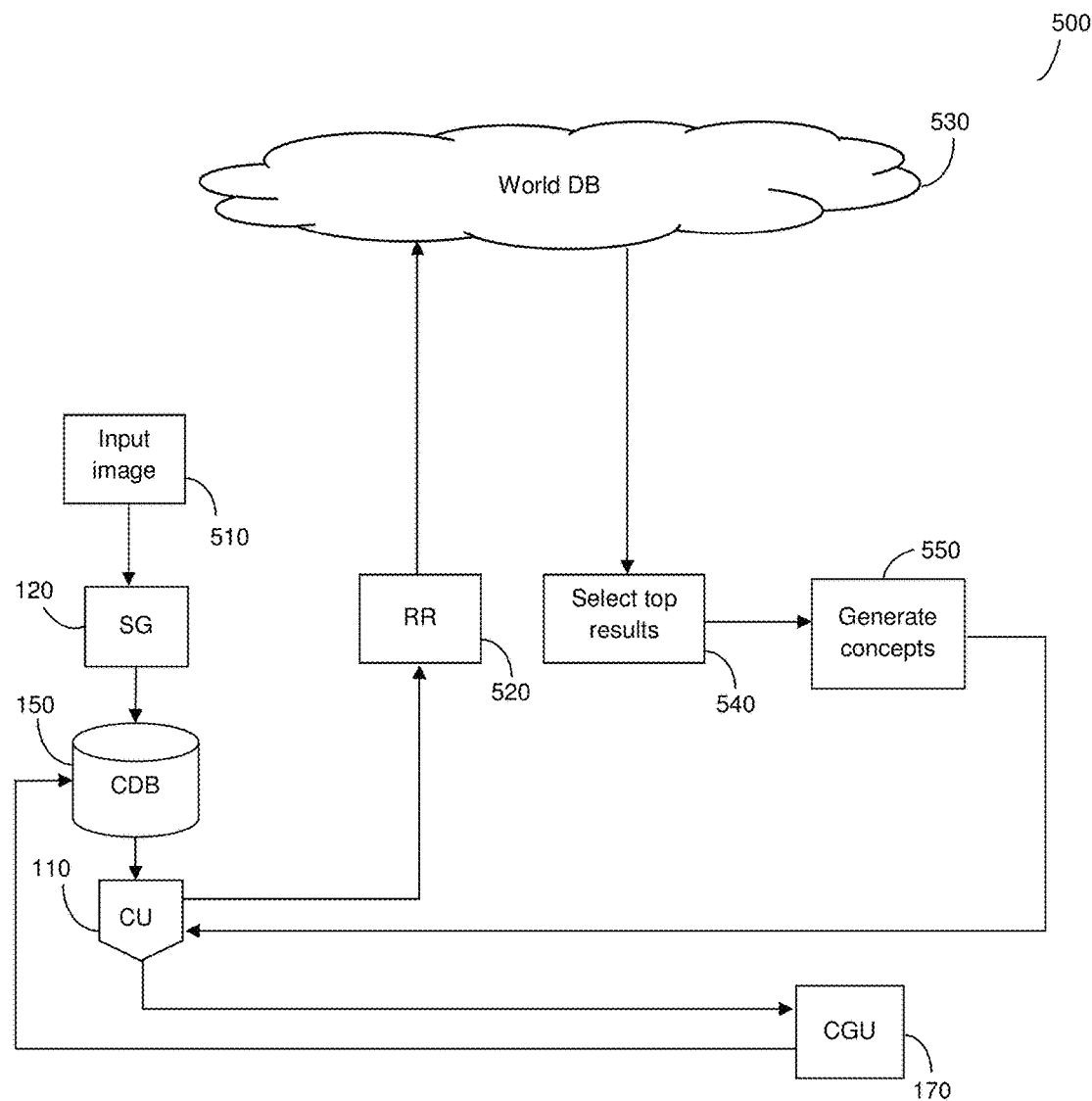
FIG. 5 is a flow diagram illustrating contextual enrichment of a concept database according to an embodiment.

FIG. 5 is a flow diagram 500 illustrating contextual enrichment of a concept database according to an embodiment. At least one input MMDE is received. In the example flow diagram 500, the at least one input MMDE is an input image 510. At least one signature is generated based on the input image 510. The signature may be generated by the SG 120. The input image 510 is then matched to the CDB 150 based on the at least one signature generated. Based on the match, the CU 110 cleans redundant elements from the input image 510 by removing elements from the input image 510 that have matching concepts within the CDB 150.

A reduced representation (RR) 520 of the input image 510 is generated based on the cleaning process. The reduced representation is then matched to a world database (DB) 530 for identifying matching MMDEs therein. Based on the match to the world DB 530, top matching results 540 are selected. The selection of top matching results is further described hereinabove with respect to FIG. 1. The top matching results are matched with the input image, and a concept is generated 550 based on the match. The cleaning unit (CU) 110 cleans from the portions of the input image 510, the signatures associated with the generated concept 550.

The generated concept is then matched to concepts stored in the CDB 150 to determine relevant associations between concepts. If such an association is determined, a context is generated, e.g., via a context generation unit 170. The context may then be sent to the CDB 150 for storage.

Figure 6:
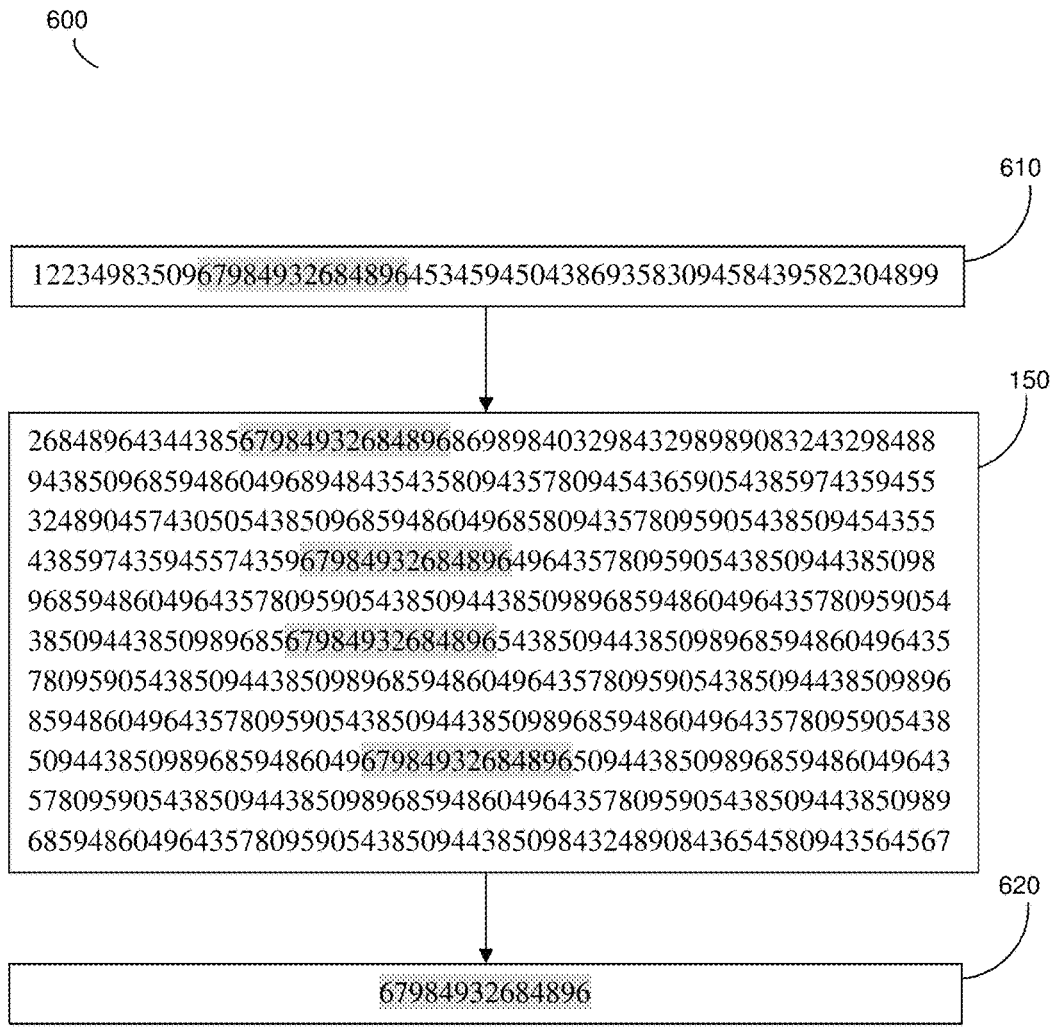
FIG. 6 is an example flow diagram illustrating matching among concepts according to an embodiment.

FIG. 6 is an example flow diagram 600 showing a matching process for the generation of a context based on a plurality of associated concept structures according to an embodiment. A concept is generated from an input MMDE (e.g., the input image 510, FIG. 5), and a signature 610 of the concept is matched to signatures of concepts stored in the concept database 150. Based on matching among the signature 610 and the signatures stored in the concept database 150, a context 620 representing the common patterns among the concepts may be generated.

It should be noted that various embodiments are described with respect to contextually enriching a concept database by adding contexts generated for newly generated concepts to the concept database merely for simplicity purposes and without limitation on the disclosed embodiments. The generated contexts may be equally added to another database (e.g., a context database) without departing from the scope of the disclosure, and a reference to the location of the generated context in the other database may be stored in the concept database, or vice versa.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for contextually enriching a concept database, comprising:
   determining, based on at least one signature of a first multimedia data element (MMDE) and signatures of a plurality of third concepts stored in the concept database, at least one first concept among the plurality of third concepts, wherein each of the at least one first concept matches at least a portion of the at least one signature of the first MMDE;
   generating a reduced representation of the first MMDE, wherein the reduced representation does not represent the at least a portion of the first MMDE matching the at least one first concept;
   comparing the reduced representation of the first MMDE to signatures representing a plurality of second MMDEs to determine a plurality of matching MMDEs among the plurality of second MMDEs;
   generating, based on the reduced representation of the first MMDE and the signatures representing the plurality of matching MMDEs, a second concept; and
   generating at least one context based on the second concept and the plurality of third concepts, wherein each context includes at least one common pattern among the second concept and at least one of the plurality of third concepts.

2. The method of claim 1, wherein generating the at least one context further comprises:
   analyzing associations among the second concept and the plurality of third concepts.

3. The method of claim 2, wherein analyzing the associations further comprises:
   correlating the second concept with each of the third concepts.

4. The method of claim 3, wherein the correlation includes comparing the second concept and one of the plurality of third concepts with respect to at least one of: ratio of sizes, ratio of angles, ratio of scale, location, and orientation.

5. The method of claim 1, wherein each context is generated based on a matrix of co-occurrences among the second concept and the plurality of third concepts.

6. The method of claim 5, wherein each context is generated with respect to threshold number of co-occurrences in the matrix.

7. The method of claim 1, wherein each MMDE is at least one of: an image, a graphic, a video stream, a video clip, a video frame, a photograph, and an image of signals.

8. The method of claim 1, wherein each concept is a collection of signatures and metadata representing the concept.

9. The method of claim 1, wherein each signature is generated by a signature generator system, wherein the signature generator system includes a plurality of at least statistically independent computational cores, wherein the properties of each core are set independently of the properties of each other core.

10. A non-transitory computer readable medium having stored thereon instructions for causing a processing circuitry to perform a process, the process comprising:

determining, based on at least one signature of a first multimedia data element (MMDE) and signatures of a plurality of third concepts stored in the concept database, at least one first concept among the plurality of third concepts, wherein each of the at least one first concept matches at least a portion of the at least one signature of the first MMDE;

generating a reduced representation of the first MMDE, wherein the reduced representation does not represent the at least a portion of the first MMDE matching the at least one first concept;

comparing the reduced representation of the first MMDE to signatures representing a plurality of second MMDEs to determine a plurality of matching MMDEs among the plurality of second MMDEs;

generating, based on the reduced representation of the first MMDE and the signatures representing the plurality of matching MMDEs, a second concept; and generating at least one context based on the second concept and the plurality of third concepts, wherein each context includes at least one common pattern among the second concept and at least one of the plurality of third concepts.

11. A system for enriching a concept database, comprising:

a processing circuitry; and a memory, the memory containing instructions that, when executed by the processing circuitry, configure the system to:

determine, based on at least one signature of a first multimedia data element (MMDE) and signatures of a plurality of third concepts stored in the concept database, at least one first concept among the plurality of third concepts, wherein each of the at least one first concept matches at least a portion of the at least one signature of the first MMDE;

generate a reduced representation of the first MMDE, wherein the reduced representation does not represent the at least a portion of the first MMDE matching the at least one first concept;

compare the reduced representation of the first MMDE to signatures representing a plurality of second MMDEs to determine a plurality of matching MMDEs among the plurality of second MMDEs;

generate, based on the reduced representation of the first MMDE and the signatures representing the plurality of matching MMDEs, a second concept; and generate at least one context based on the second concept and the plurality of third concepts, wherein each context includes at least one common pattern among the second concept and at least one of the plurality of third concepts.

12. The system of claim 11, wherein the system is further configured to:

analyze associations among the second concept and the plurality of third concepts.

13. The system of claim 12, wherein the system is further configured to:

correlate the second concept with each of the at least one of the plurality of third concepts.

14. The system of claim 13, wherein the correlation includes comparing the second concept and one of the plurality of third concepts with respect to at least one of: ratio of sizes, ratio of angles, ratio of scale, location, and orientation.

15. The system of claim 11, wherein each context is generated based on a matrix of co-occurrences among the second concept and the plurality of third concepts.

16. The system of claim 15, wherein each context is generated with respect to threshold number of co-occurrences in the matrix.

17. The system of claim 11, wherein each MMDE is at least one of: an image, a graphic, a video stream, a video clip, a video frame, a photograph, and an image of signals.

18. The system of claim 11, wherein each concept is a collection of signatures and metadata representing the concept.

19. The system of claim 11, wherein each signature is generated by a signature generator system, wherein the signature generator system includes a plurality of at least statistically independent computational cores, wherein the properties of each core are set independently of the properties of each other core.

20. The system of claim 19, further comprising:

the signature generator system.

* * * * *